Aug. 11, 1925.

J. A. DAY 1,549,299

CHILD'S VEHICLE

Filed Dec. 14, 1922

Inventor
Joseph A. Day.

By Ralzemond A. Parker
Attorney

Patented Aug. 11, 1925.

1,549,299

UNITED STATES PATENT OFFICE.

JOSEPH A. DAY, OF DETROIT, MICHIGAN.

CHILD'S VEHICLE.

Application filed December 14, 1922. Serial No. 606,798.

*To all whom it may concern:*

Be it known that I, JOSEPH A. DAY, a citizen of the United States, residing at Detroit, county of Wayne, State of Michigan, have invented a certain new and useful Improvement in Children's Vehicles, and declare the following to be a full, clear, and exact description of the same, such as will enable others skilled in the art to which it pertains to make and use the same, reference being had to the accompanying drawings, which form a part of this specification.

My invention relates to an improved play vehicle or cycle for children capable of being propelled by the rider by pushing with the feet against the ground, and the invention consists in the novel construction and combination hereinafter more particularly described.

The object is to provide a play vehicle for children capable of being propelled by the rider by pushing with the feet against the ground, and so constructed that the seat support yields downwardly under the weight of the rider and reacts upwardly when the weight thereon is lessened by the rider pushing with the feet against the ground, producing a novel sensation and also assisting in the propulsion of the vehicle.

The above and other objects, together with the particular construction, will more fully appear from the following description, appended claims, and accompanying drawing, in which:

Figure 1:
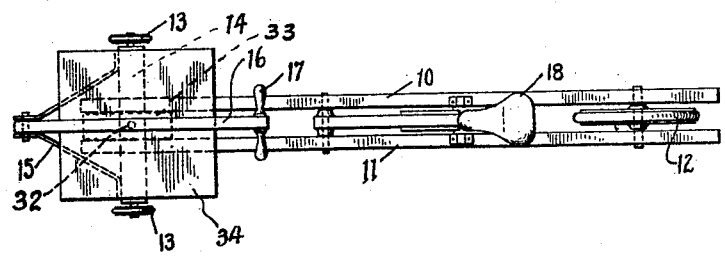
Figure 1 is a plan view of a preferred type of my improved vehicle.
Figure 2:
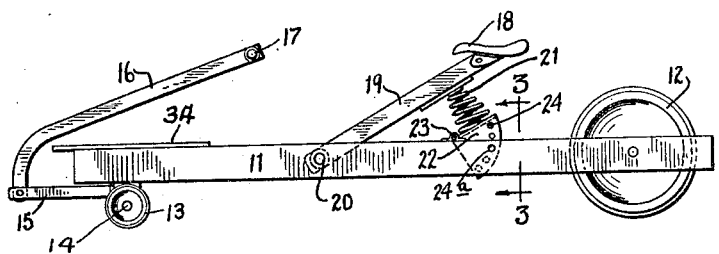
Fig. 2 is a side elevation of the vehicle shown in Fig. 1.

In the preferred embodiment of my invention shown in Figs. 1 and 2, the frame of the vehicle comprises a pair of longitudinal frame members 10 and 11 suitably braced apart, and between which is journaled at the rear a single supporting wheel 12. A pair of small supporting wheels 13 are carried by a pivotally mounted front axle 14 which is secured by a king bolt 32 underneath block 33, which block is fastened between the frame members 10 and 11. A platform 34 is mounted upon the forward end of the frame members. Handle-supporting members 15 extend forwardly from the pivotally supported front axle 14 and carry a guiding handle 16 which extends up over the front end of the vehicle and rearwardly toward the seat. This handle is provided with a hand grip 17 disposed conveniently for the use of the rider. Obviously the running gear and guiding mechanism might be of any conventional construction as such construction is standard and forms no part of my invention.

I provide a seat yieldingly supported upon the frame to move downwardly under the weight of a rider and react when this weight is lessened to throw the seat upwardly. In the construction shown in the drawing, a seat-supporting member 19 is pivoted at one end between the frame members as at 20 and is provided at the opposite end with a seat 18. I support the seat in the elevated position by resilient means capable of yielding to permit the seat to move downwardly and rearwardly under the weight of the rider adapted to react when the weight on the seat is reduced by the rider pushing downwardly on the ground with his feet to propel the vehicle and throw the seat upwardly and forwardly the vehicle, producing a novel sensation with each pushing movement of the feet and assisting distinctly in the propulsion of the car.

In the form illustrated in Figs. 1 and 2, I use a tension coil spring 21 supporting the seat bar 19. However, other suitable resilient supporting means might be employed. This spring is supported by an adjustable block 22 by means of which the spring may be raised or lowered to position the seat to different elevations to accommodate children of varying size. As shown in the drawing, the block is in the form of a segment pivoted between the frame members as at 23 and provided with a series of apertures 24 to register with a slot 24ª in the frame. A fastening pin 25 is provided to extend through this slot and through an aperture in the block to hold the block at different positions of adjustment.

Figure 4:
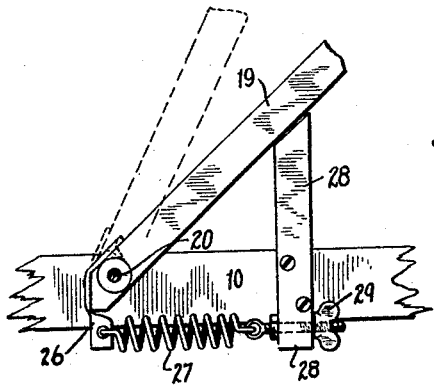
Figs. 4 and 5 represent modified forms of the seat-supporting mechanism.
Figure 3:
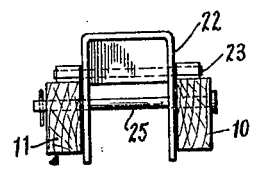
Fig. 3 is a vertical sectional view taken on the line 3—3 of Fig. 2.
Figure 5:
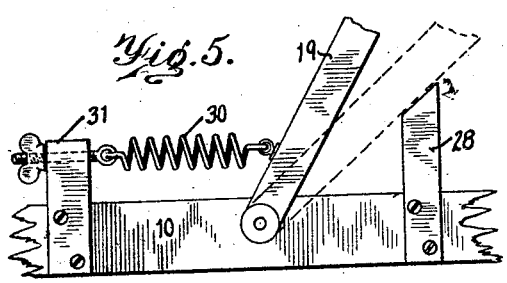

In the form illustrated in Figs. 4 and 5 the same result is accomplished by means of different constructions. In Fig. 4 the seat-supporting bar is provided at its lower end with a short arm 26, to the free end of which is secured a tension spiral spring 27, the opposite end of which spring is adjustably fastened to a support 28 by means of a wing nut and bolt arrangement 29. By means of the wing nut it is possible to increase or reduce the tension of the spring. As shown in Fig. 4, the seat is at the lowermost position to which it would be forced by its carried weight and it rests upon the upper end of the support which affords a positive stop to the downward movement of the seat. When the weight on the seat is lessened it would fly upwardly until the seat bar had arrived at, for example, the position shown in dotted outline.

In Fig. 5 another modification is shown in which a tension spring 30 is secured at one end to the seat-supporting member 19 and at the other end to the frame as at 31 so as to hold the seat-supporting member in the elevated position yieldable to permit its downward movement under weight on the seat.

What I claim is:

1. In a vehicle of the class described, the combination of a frame having supporting wheels at front and rear, a seat support pivoted at one end forwardly of the center of the frame extending rearwardly and upwardly therefrom and provided at the opposite elevated end with a seat for a rider, and spring means to support said seat in the elevated position, said spring adapted, when the weight on the seat is reduced by the rider pushing with his feet on the ground to propel the vehicle, to throw the seat forwardly and upwardly a distance proportioned to the reduction of weight on the seat.

2. In a vehicle of the class described, the combination with a frame having supporting wheels to tractionally engage the ground, a seat support extending upwardly from the frame and provided with a seat, and yielding means carried by the frame supporting said seat support in an elevated position, said yielding means adapted under the weight of the rider on the seat to yield downwardly to permit the seat to move downwardly and rearwardly and adapted, when the carried weight on the seat is reduced by the rider pushing with the feet on the ground to propel the vehicle, to throw the seat upwardly and forwardly.

3. In a vehicle of the class described, the combination of a frame having supporting wheels to tractionally engage the ground and a seat having a spring-support adapted to yield downwardly under the carried weight of a rider, said spring support adapted, when the weight thereon is reduced by the rider pushing downwardly on the ground with his feet to propel the vehicle, to react upwardly and assist the propulsion.

4. In a vehicle of the class described, a frame having supporting wheels at front and rear, a seat-supporting bar pivoted at one extremity to the frame extending rearwardly and upwardly therefrom, a rider's seat at the opposite extremity of said bar, a spring carried by the frame to support the seat end of said bar in the elevated position yieldable in proportion to the weight of a rider on the seat to permit the seat to travel downwardly and rearwardly as the seat bar swings about its pivot and adapted to react when the carried weight of the seat is reduced by the rider pushing with his feet on the ground to propel the vehicle to throw the seat upwardly and forwardly about its pivot a distance proportioned to such reduction of carried weight.

5. In a vehicle of the class described, a frame having supporting wheels at front and rear, a seat support pivoted at one end forwardly of the frame extending rearwardly and upwardly therefrom and provided at the opposite elevated end with a seat for a rider, and a spring to support said seat in the elevated position yieldable under the carried weight thereon to permit said seat support to travel downwardly adapted, when the weight on the seat is reduced by the rider pushing with his feet on the ground to propel the vehicle, to throw the seat forwardly and upwardly, said spring support for the seat adjustable to support the seat in different positions of elevation.

6. In a vehicle of the class described, in combination, a frame having supporting traction wheels at front and rear and provided with a pair of longitudinally-extending frame members, a seat-supporting member pivoted at one end between said frame members and extending upwardly and rearwardly from said pivot and provided with a seat at its elevated end, and spring means carried by the frame sustaining the seat support to resist the downward movement thereof as it swings about its pivot, said spring means controlling the position of said seat support adapted when the weight on the seat is reduced by the rider pushing with his feet on the ground to propel the vehicle to throw said seat forwardly and upwardly.

In testimony whereof, I sign this specification.

JOSEPH A. DAY.